United States Patent [19]
Feldman

[11] Patent Number: 6,018,422
[45] Date of Patent: Jan. 25, 2000

[54] THREE-DIMENSIONAL MICROSTRUCTURES AND METHODS FOR MAKING THREE-DIMENSIONAL MICROSTRUCTURES

[75] Inventor: Martin Feldman, Baton Rouge, La.

[73] Assignee: Board of Supervisors of Louisiana State University and Agricultural and Mechanical College, Baton Rouge, La.

[21] Appl. No.: 09/165,789

[22] Filed: Oct. 2, 1998

Related U.S. Application Data

[62] Division of application No. 08/347,804, Nov. 30, 1994, abandoned.

[51] Int. Cl.[7] .................................................. G02B 27/10
[52] U.S. Cl. .......................... 359/619; 359/618; 359/622; 430/394; 205/75
[58] Field of Search .................................. 359/618, 619, 359/621, 622, 623, 648, 649; 430/394, 320; 205/75

[56] References Cited

U.S. PATENT DOCUMENTS

| | | | |
|---|---|---|---|
| 4,661,212 | 4/1987 | Ehrfeld et al. | 205/75 |
| 4,738,010 | 4/1988 | Ehrfeld et al. | 29/898.12 |
| 5,045,439 | 9/1991 | Maner et al. | 430/394 |

FOREIGN PATENT DOCUMENTS 6208006  7/1994  Japan .

OTHER PUBLICATIONS

M. Vartanian et al., "Polycapillary Collimator for Point Source Proximity X–Ray Lithography," J. Vac. Sci. Technol. B., vol. 11, No. 6, pp. 3003–3007 (1993).

H.N. Chapman et al., "X–Ray Focusing Using Square Channel–Capillary Arrays," Rev. Sci. Instrum., vol. 62, No. 6, pp. 1542–1561 (1991).

Q.F. Xiao et al., "Polycapillary–Based X–Ray Optics," pp. 376–383 in G.G. Long et al. (eds.) , *Synchrotron Radiation Instrumentation* (1994).

S.A. Hoffman et al., "Developments in Tapered Monocapillary and Polycapillary Glass X–Ray Concentrators," pp. 384–389 in G.G. Long et al., (eds.). *Synchrotron Radiation Instrumentation* (1994).

K.F. Voss et al., "A Capillary Concentrator for an X–Ray Microprobe," pp. 390–396 in G.G. Long et al. (eds.) , *Synchrotron Radiation Instrumentation* (1994).

Q.F. Xiao et al., "Guiding Hard X Rays with Glass Polycapillary Fiber," pp. 397–400 in G.G. Long et al. (eds.), *Synchrotron Radiation Instrumentation* (1994).

J.B. Ullrich et al., "Potential for Concentration of Synchrotron Beams with Capillary Optics," pp. 401–406 in G.G. Long et al. (eds.), *Synchrotron Radiation Instrumentation* (1994).

G.J. Chen et al., "Ray–Tracing of X–Ray Focusing Capillaries," pp. 407–411 in G.G. Long et al. (eds.), *Synchrotron Radiation Instrumentation* (1994).

W. Henke et al., "Simulation and Experimental Study of Gray–Tone Lithography for the Fabrication of Arbitrarily Shaped Surfaces," Proceedings, IEEE Micro Electro Mechanical Systems (Oiso, Japan, Jan. 25–28, 1994).

*Primary Examiner*—Loha Ben
*Attorney, Agent, or Firm*—Bonnie J. Davis

[57] ABSTRACT

Methods are disclosed for making microstructures. In one method, the resist layer is reversibly deformed during exposure. When the resist is flattened and developed after exposure, non-vertical features result that are not obtainable through other existing means. One application of this method is to make nested cones suitable for use as a highly efficient x-ray lens. In another disclosed method, "halftone" lithography is used to generate microstructures having features whose height may vary continuously. One application of this method is to make a novel telescope array, a thin film having telescopic magnification properties.

31 Claims, 9 Drawing Sheets

Eyeglasses

THREE-DIMENSIONAL MICROSTRUCTURES AND METHODS FOR MAKING THREE-DIMENSIONAL MICROSTRUCTURES

This is a divisional of application Ser. No. 08/347,804, filed Nov. 30, 1994, now abandoned, the entire disclosure of which is incorporated by reference.

This invention pertains to microstructures, and to methods for making microstructures whose three-dimensional shapes are not constrained by conventional lithographic limitations. For example, the novel methods may be used to make a novel x-ray lens, or a novel thin array of microtelescopes.

Microscopic machines, structures, devices, and integrated circuits (hereafter collectively called "microstructures" for simplicity) have wide application. Integrated circuits are used in devices too numerous to be recited. Microstructures other than integrated circuits, structures whose minimum dimensions are typically on the order of several hundred microns down to one micron, or even into the submicron range, also have a wide range of applications. Microstructures have been used in micromechanics, microoptics, integrated optics, sensors, actuators, and chemical engineering. Microstructures that have been built include such structures as gears, nozzles, chromatographic columns, acceleration sensors, microturbines, micromotors, and linear actuators.

Microstructures are usually manufactured through a lithographic process. In lithography, one or more "masks" are initially prepared, each mask incorporating all or part of the pattern to be formed on a workpiece. Transparent and opaque areas of the mask represent the desired pattern. Radiation, such as visible light, ultraviolet light, x-rays, an electron beam, or an ion beam, is transmitted through the mask onto a resist, such as a photoresist or an x-ray resist. After exposure, the resist (which may have either a positive tone or a negative tone) is developed to form the pattern. The pattern is then generally transferred to the workpiece in a subsequent step.

Workers in the field of x-ray lithography have long sought a highly efficient x-ray lens. Despite the importance that an efficient x-ray lens would have, there have been no prior, truly successful x-ray lenses. Previous attempts have used capillary arrays (the so-called "Kumakov lens"), and slumped multichannel arrays of square holes to collimate x-rays. These designs have inherent limitations in uniformity, throughput, and angle control. See M. Vartanian et al., "Polycapillary Collimator for Point Source Proximity X-Ray Lithography," J. Vac. Sci. Technol. B., vol. 11, no. 6, pp. 3003–3007 (1993); and H. N. Chapman et al., "X-Ray Focusing Using Square Channel-Capillary Arrays," Rev. Sci. Instrum., vol. 62, no. 6, pp. 1542–1561 (1991); Q. F. Xiao et al., "Polycapillary-Based X-Ray Optics," pp. 376–383 in G. G. Long et al. (eds.), *Synchrotron Radiation Instrumentation* (1994); S. A. Hoffman et al., "Developments in Tapered Monocapillary and Polycapillary Glass X-Ray Concentrators," pp. 384–389 in G. G. Long et al. (eds.), *Synchrotron Radiation Instrumentation* (1994); K. F. Voss et al., "A Capillary Concentrator for an X-Ray Microprobe," pp. 390–396 in G. G. Long et al. (eds.), *Synchrotron Radiation Instrumentation* (1994); Q. F. Xiao et al., "Guiding Hard X Rays with Glass Polycapillary Fiber," pp. 397–400 in G. G. Long et al. (eds.), *Synchrotron Radiation Instrumentation* (1994); J. B. Ullrich et al., "Potential for Concentration of Synchrotron Beams with Capillary Optics," pp. 401–406 in G. G. Long et al. (eds.), *Synchrotron Radiation Instrumentation* (1994); and G. J. Chen et al., "Ray-Tracing of X-Ray Focusing Capillaries," pp. 407–411 in G. G. Long et al. (eds.), *Synchrotron Radiation Instrumentation* (1994).

Compared to these prior structures, uniformity, throughput, and angle control would be greatly improved if an x-ray lens could be made of nested cones of suitable scale. However, a method for generating nested cones of suitable scale has not previously been available.

The imaging properties that a series of nested cones made of a reflective material would have are known (see FIG. 1). "Nested cones" are a set of cones having a common axis and a common vertex. Rays parallel to the common axis are reflected to a focal point halfway between the base of the cones and their common vertex. As illustrated in FIG. 1, only a small portion of each cone is present, near its base, to insure that the rays undergo only one reflection. (Multiple reflections are undesirable, as they would result in rays diverging from the focus.)

The resolution of a series of nested cones is limited by the separation between the cones. For an array of constant thickness (i.e., the depth of the cones measured in a direction parallel to their common axis), resolution increases with the radius of the largest cone of the set of nested cones.

Nested cones constructed so that all rays reflect at relatively shallow grazing angles (e.g., about 1° to about 5°, preferably about 2°) would be particularly useful for soft x-rays (e.g., those having a wavelength between about 5 Å and about 20 Å, preferably about 10 Å). Soft x-rays have high reflectivities at grazing angles. The ability to focus soft x-rays is very important, both in concentrating a parallel x-ray beam from a synchrotron to a high power density, and in collimating a diverging beam from a point source.

Despite the desirability of creating a nested cone x-ray lens, no one has previously been able to construct nested cones of suitable scale, primarily because nested cones have non-vertical boundaries. Features with non-vertical boundaries have been difficult or impossible to generate with prior lithographic techniques.

In making a microstructure (such as a miniature gear or motor), there has previously been a limited ability to sculpt the microstructure in three dimensions. In conventional lithography a perpendicular x-ray beam strikes a resist, forming vertical edges in the pattern. It is difficult to generate objects with curved edges or walls with such a method. Except for special cases, features curved in three dimensions cannot be constructed through prior methods.

Prior work on non-vertical boundaries between lithographic regions has been limited to a few instances using a constant-angle projection (or a small number of constant-angle projections) of x-rays onto a wafer. No prior work is known in which non-vertical lithographic boundaries have been made other than through such a constant-angle projection. Constant-angle projections greatly limit the types of non-vertical boundaries that may be formed, and in particular such projections do not allow the formation of nested cones.

In machining microstructures other than integrated circuits, it would often be desirable to be able to have the heights of features vary continuously (e.g., as in a sphere), rather than be limited to the current norm of flat planes and vertical steps. No prior method is known for creating lithographic features having a controllable and continuously variable height.

Conventional resist processing for microlithography has historically been based on the requirements of integrated circuit lithography, where vertical boundaries and complete removal of resist are desired for patterned areas. In principle, continuous variations in height could be obtained by varying the thickness of the absorber on the mask. Regions of thicker absorber would transmit fewer x-rays, resulting (in a positive resist such as PMMA, polymethylmethacrylate) in thicker remaining resist after exposure and development. But in practice such a mask would be difficult to make, and the process would be hard to control. For example, small changes in the x-ray wavelength can induce large changes in the thicknesses of the patterned features. No prior method for overcoming these problems is known.

PMMA is a commonly used x-ray resist. PMMA is a thermoplastic material that softens at temperatures above 100° C. The softening mechanism is largely unrelated to the chain scission mechanism by which a latent image is formed in an exposed PMMA resist. Consequently, a PMMA resist may be heated to deform it either before or after exposure, but before development. After the exposure, the resist may be returned to its original shape either before or after development. Deformation of the resist through heating allows the creation of shapes that cannot be created through conventional lithographic means, but deformation by heating introduces unwanted and uncontrollable distortions to the resist.

U.S. Pat. No. 5,045,439 discloses a method for producing microstructures having a triangular or trapezoidal cross section by irradiating a resist from separate, discrete angles.

U.S. Pat. No. 14,661,212 discloses a honeycombed array of hexagonal metal plates produced through LIGA techniques. See also U.S. Pat. No. 4,738,010.

Although the inventor has been unable to locate a printed reference disclosing the following, the inventor recalls previously seeing plastic sheets having a square array of spherical lenses on one side; or a square array of two plastic sheets, each sheet having cylindrical lenses on one face of the sheet, with the two sheets positioned so that the axes of the cylinders cross one another at right angles. The inventor is not aware of any prior thin array of microtelescopes, however.

Novel methods have been discovered for making novel three-dimensional microstructures. In one novel method, the resist layer is reversibly deformed during exposure. When the resist is flattened and developed after exposure, non-vertical features result that are not obtainable through any other existing means. One application of this method is to make novel nested cones suitable for use as an x-ray lens.

In another novel method, "halftone" lithography is used to generate three-dimensional microstructures having features whose height may vary continuously. One application of this method is to make a novel telescope array, a thin film having telescopic magnification properties.

BRIEF DESCRIPTION OF THE DRAWINGS

FIG. 6($b$) illustrates the formation of a single image in the eye from several telescopes in a curved microtelescope array.

Deformation of Resist to Create Novel Three-Dimensional Features

The most commonly used resist in the LIGA process of micromachining is polymethylmethacrylate, or PMMA. ("LIGA" is a an acronym for a German phrase meaning "lithography galvanoplating and plastic molding.") PMMA is a preferred resist to use in the novel technique, although other resists known in the art may be used as well.

PMMA is sufficiently flexible that thin films of PMMA may be elastically and reversibly deformed at ambient temperature, without heating. Such plastic, reversible deformation without applied heat, and without distortion may be accurately controlled to construct precise three-dimensional shapes and devices that cannot be made through conventional techniques, or through heat-induced deformation with its accompanying distortion.

EXAMPLE

Nested Cones

The following steps will be used to construct an x-ray lens made of nested cones.

(1) A PMMA resist film is cast onto a glass substrate. Thicknesses for such films of about 100 $\mu$m may routinely be obtained by methods known in the art, such as casting from a solvent, deforming the cast solid in a heated press, or polymerizing PMMA in a mold. Thicknesses greater than or less than 100 $\mu$m may be desirable in some cases, the lower limit on thickness being that at which the resist will have too great a tendency to tear, and the upper limit being that at which it will not readily bend in response to the deformation stress. Annealing at 100° C. for 30 minutes (either before or after exposure) is preferred to help prevent cracking during the subsequent development stage.

(2) The resist film is bonded to a lucite ring with a solvent such as ethylene dichloride, and the resist film is removed from the substrate. The PMMA film is under tension following casting from solvent, and thus lies flat on the ring.

Figure 7:
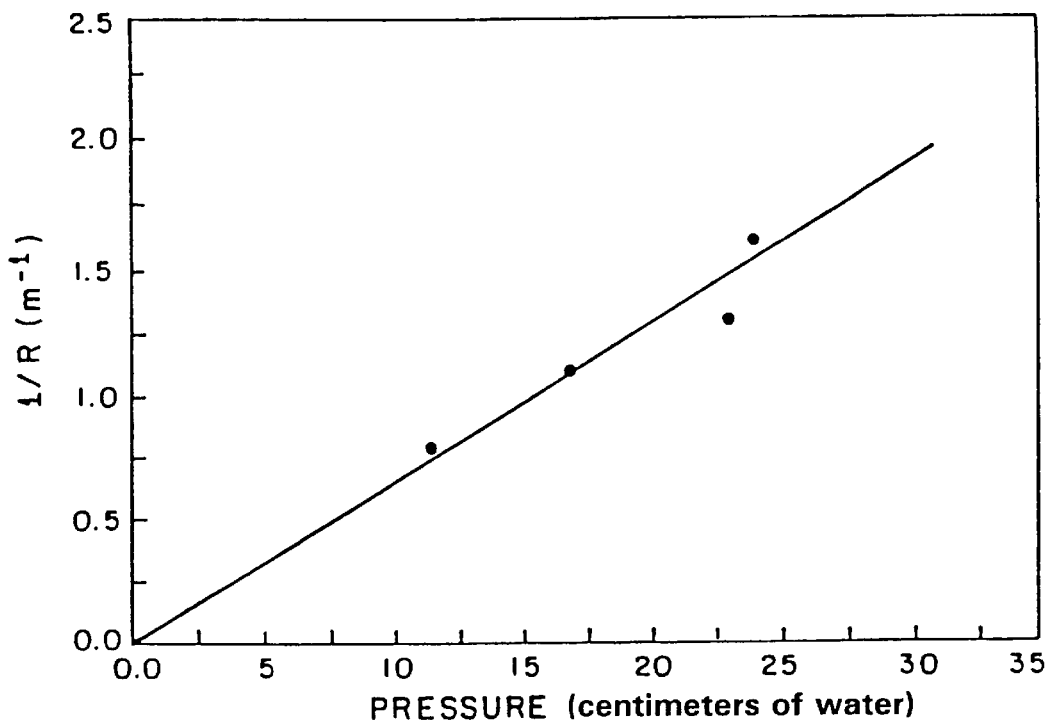
FIG. 7 illustrates the variation in radius of a PMMA membrane as a function of hydrostatic gas pressure applied.

(3) The film is deformed under hydrostatic gas pressure (such as nitrogen, air, helium, or the like), creating a spherically-shaped section. Radii below 10 inches have readily been obtained in the laboratory with a few PSI of pressure on a ring of radius 2 cm. FIG. 7 illustrates the radius of a 2 cm diameter, 100 $\mu$m thick PMMA membrane as a function of applied hydrostatic gas pressure. With the film under tension, the radius of curvature has been observed to be approximately inversely proportional to the applied pressure. The quality of the spherical surfaces that have been obtained has been such that when a 25 cm radius surface was used as a mirror, light was focused to a spot less than 1 mm in diameter.

Figure 8:
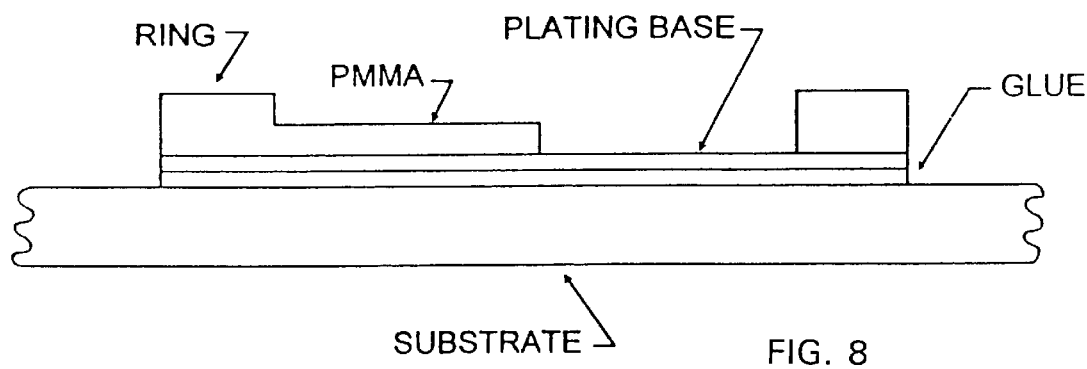
FIG. 8 illustrates a developed PMMA pattern, glued to a substrate after deformation and exposure, and ready for plating.
Figure 10:
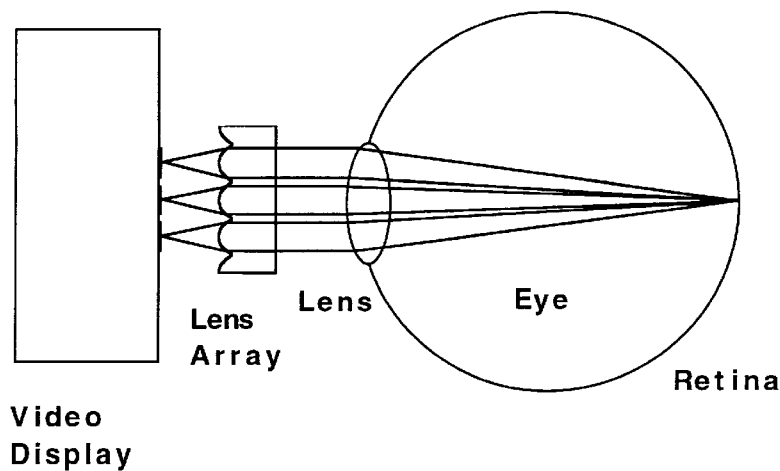
FIG. 10 illustrates an array of a plurality of lenses in combination with a video display.
Figure 11:
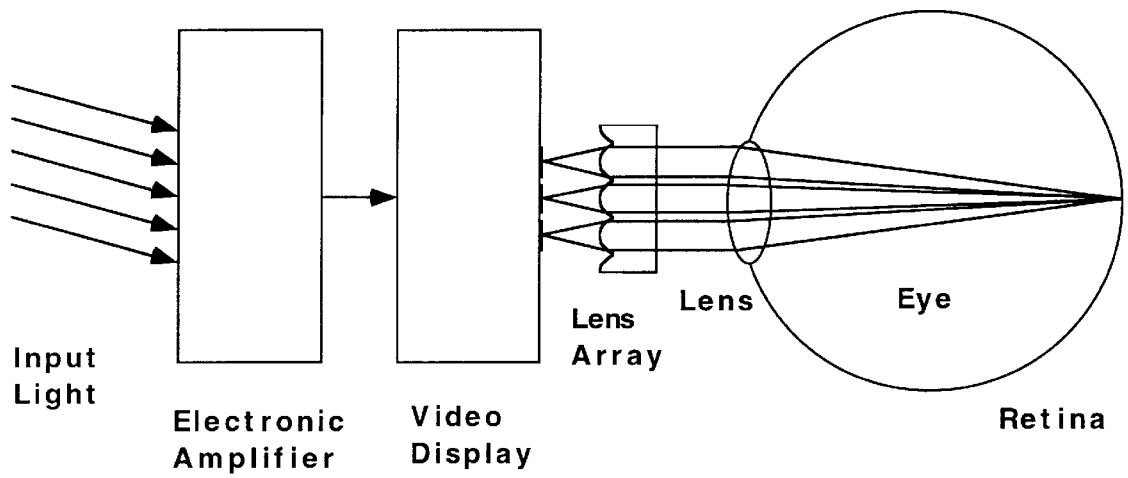
FIG. 11 illustrates an array of a plurality of lenses in combination with an electronic amplifier and a video display.
Figure 12:
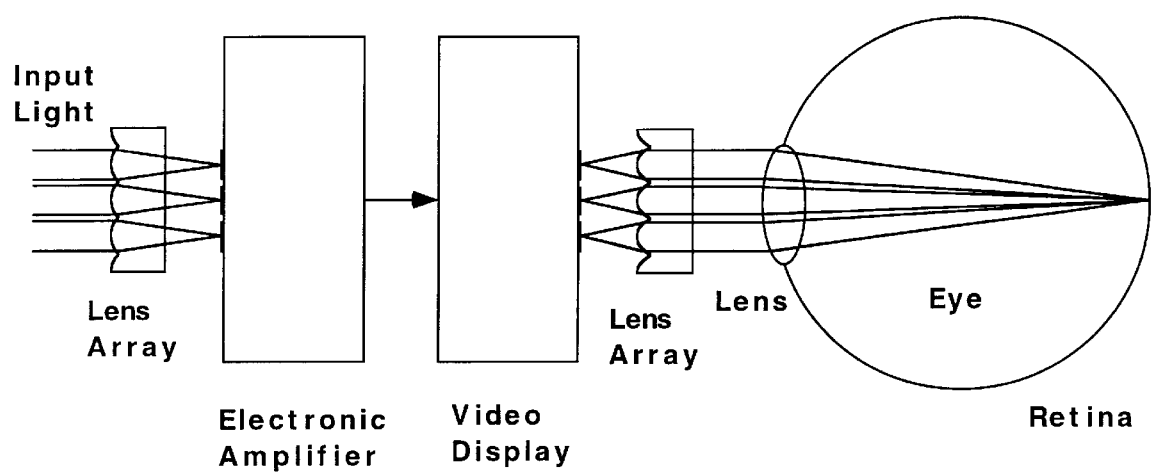
FIG. 12 illustrates a first array of single lenses, an electronic amplifier, a video display, and a second array of single lenses.

(4) Patterns in the resist are exposed through conventional means. The resist is then returned to its original flat shape, preferably by gluing to a substrate to hold it flat during plating, as illustrated in FIG. 8. The resist is then developed through conventional means. In particular, a mask of concentric circles will be used to expose the resist while the resist is deformed into a spherical surface. The concentric circles are spaced between about 1 and about 100 microns apart from one another, preferably about 10 microns maximum, with an individual ring thickness preferably less than half the spacing between adjacent rings to maximize the transmission of x-rays through the nested cones. The spacing between cones is proportional to the radius of the cones, because for a constant cone thickness the projected area is proportional to the cone angle. The spherical surface has a radius of curvature typically between about 1 cm and about 10 m, preferably about 25 cm. After removal of pressure and development of the resist, the developed pattern will be the desired nested cones. Holding the cones together in a self-supporting structure will be desirable, for example by using two relatively thin ribs at right angles, intersecting one another at the axis of the cones. The ribs can extend beyond the outermost cone to act as support points for the array, and more than two ribs may be used if desired. The ribs are preferably made of the same material as the cones themselves, and are formed and plated at the same time as the rest of the structure.

(5) A plating base, such as a 30–500 Å layer of gold, is deposited on the PMMA resist through conventional means, and the resist is reattached to a flat substrate. Note that the top surface of the resist may be chosen to be the less heavily exposed "downstream" side, which aids in the fidelity of the patterning. The less heavily exposed resist, which develops at a slower rate, is then in contact with the developer for a longer time, in contrast with the conventional case.

(6) The plating base is plated through conventional means, such as by electroplating a layer of nickel as thick as the PMMA layer (or slightly smaller). (Plating can be performed with a high-Z material, such as platinum or gold. If nickel is used instead, it may be desirable to then plate gold over the nickel to improve x-ray reflectivity.) The metal workpiece is then removed from the resist by dissolving the remaining PMMA and glue in solvent.

The diameter of the array is preferably between about 1 mm and about 1000 mm, and is preferably about 40 mm. Typical spacings between adjacent cones will be between about 1 $\mu$m and about 100 $\mu$m, preferably about 10 $\mu$m maximum. The distance from the base of the cones to their common vertex is twice the desired focal length; a typical base-to-vertex distance would be about 10–15 cm for an x-ray point-source collimator, with a range from about 1 cm to about 10 m.

While the specific example above described deformation of the resist into a spherical shape through gas pressure, other means of deformation, and other shapes for specific desired geometries will also work in practicing this invention. The resist could be deformed into a non-spherical shape, if desired, by stretching the film over a mold of an appropriate shape (with or without the application of heat). For example in some applications it might be desirable to stretch the resist film over a mold in the shape of a paraboloid. Or it might be desirable to stretch a single film over a complex surface, so that there would be different areas of deformation on one film. One application would be to use a complex shape to achieve a uniform flux from a non-uniform beam. Other deformation shapes for other applications will readily occur to one of skill in the art who is given the teachings of the present specification.

It is desirable that the features comprising the nested cones have a high aspect ratio, that is, a high ratio between the depth of a feature and the resolution of the feature. Methods of fabricating microstructures having a high aspect ratio are disclosed in Y. Vladimirsky et al., "Microstructures and Methods for Manufacturing Microstructures," international patent application serial number PCT/US94/10164, filed Sep. 9, 1994, the entire disclosure of which is incorporated by reference.

Halftone Printing to Create Novel, Continuously Variable Feature Heights

In halftone patterning, pixels in an array are modulated in size rather than in intensity. A familiar use of halftone patterning—albeit for an entirely different purpose—is the use of halftone printing to obtain gray scales for two-dimensional reproductions of a photograph, such as are commonly seen in newspapers. All known prior uses of halftone patterning have been in reproducing two-dimensional images. No prior use of halftone patterning to make a three-dimensional lithographic structure is known.

In novel x-ray halftone lithography, features may be formed with a continuously variable height, using an x-ray mask divided into an array of pixels. As used in the specification and the claims, the height of a feature is considered to be "continuously variable" if two adjacent regions of the feature that are no farther apart than 10 $\mu$m may, where desired, have average heights that are different from one another, but that differ from one another by a distance that is less than 1 $\mu$m, preferably less than 0.1–0.5 $\mu$m; and where the boundaries between regions of different heights need not be vertical, unless a vertical boundary is specifically desired. Blurring, discussed below, can assist in smoothing the boundary between adjacent regions, and in making the surface "continuously variable." The height of a feature is not considered to be "continuously variable" under this definition if the feature is one that can be generated with a conventional lithographic mask using a constant-angle projection (or a discrete number of constant-angle projections).

Figure 1:
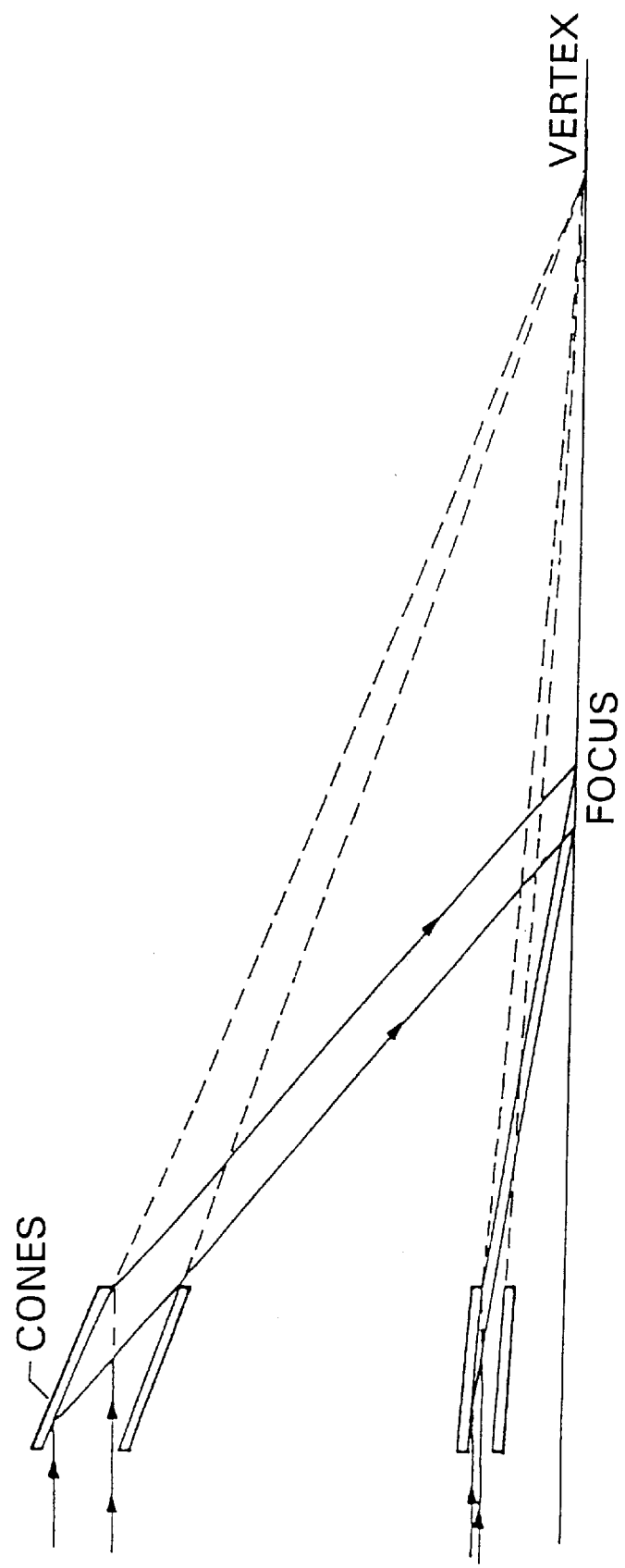
FIG. 1 illustrates schematically a cross section of a small portion of an array of nested cones.
Figure 2:
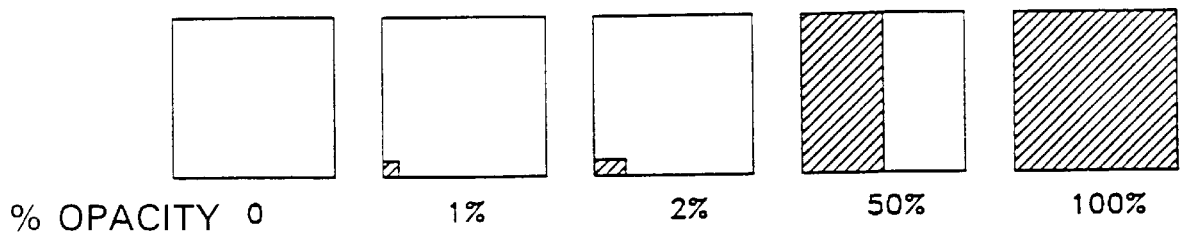
FIG. 2 illustrates typical pixels for halftone x-ray lithography.

The transmission through each pixel is determined by the fraction of the area in that pixel that is covered by absorber. Because each point in a given pixel either does, or does not, absorb radiation, uniformity problems are avoided. See FIG. 2, illustrating typical pixels for halftone x-ray lithography. In FIG. 2, the opaque fraction for each pixel is stated. The preferred pixel size for x-ray lithography is between about 1 micron square and about 100 microns square, most preferably about 10 microns square.

By contrast, if the thickness of the absorber were varied, so that different points on the mask had different transmissivities, small changes in the wavelength of incident radiation could have large (and very possibly non-reproducible) effects on resulting feature thickness.

The half-tone exposure is preferably blurred slightly, so that neither the fine structure within each pixel, nor the boundaries between pixels, are printed.

By contrast, in some applications it may be desirable to preserve the fine structure of the pixels without blurring. If such a developed resist is viewed in visible light, and if the pixel width is less than the wavelength of the light, there will be no diffraction, but the narrow vertical columns will effectively modulate the index of refraction of the resist. This effect can yield images with novel properties. Such images can be used, for example, as difficult-to-counterfeit security marks, similar in some ways to the holograms that are found on many credit cards. Such security marks would affect the reflectivity of the image as a function of both position and wavelength. There could also be polarization effects that could rapidly change as a function of position. These effects result from the presence of numerous elements smaller than the wavelength of visible light (i.e., smaller than about 700 nm), elements whose size can vary from pixel to pixel. Alternatively, a mold for such a security mark could be manufactured as otherwise described above, and the security marks could be mass-produced from such a mold via known high-quality casting techniques. If desired, the spaces between features on a security mark could be filled with a material having a different refractive index, thereby making it more difficult for a would-be counterfeiter to reverse-engineer a mold from a security mark.

Figure 3:
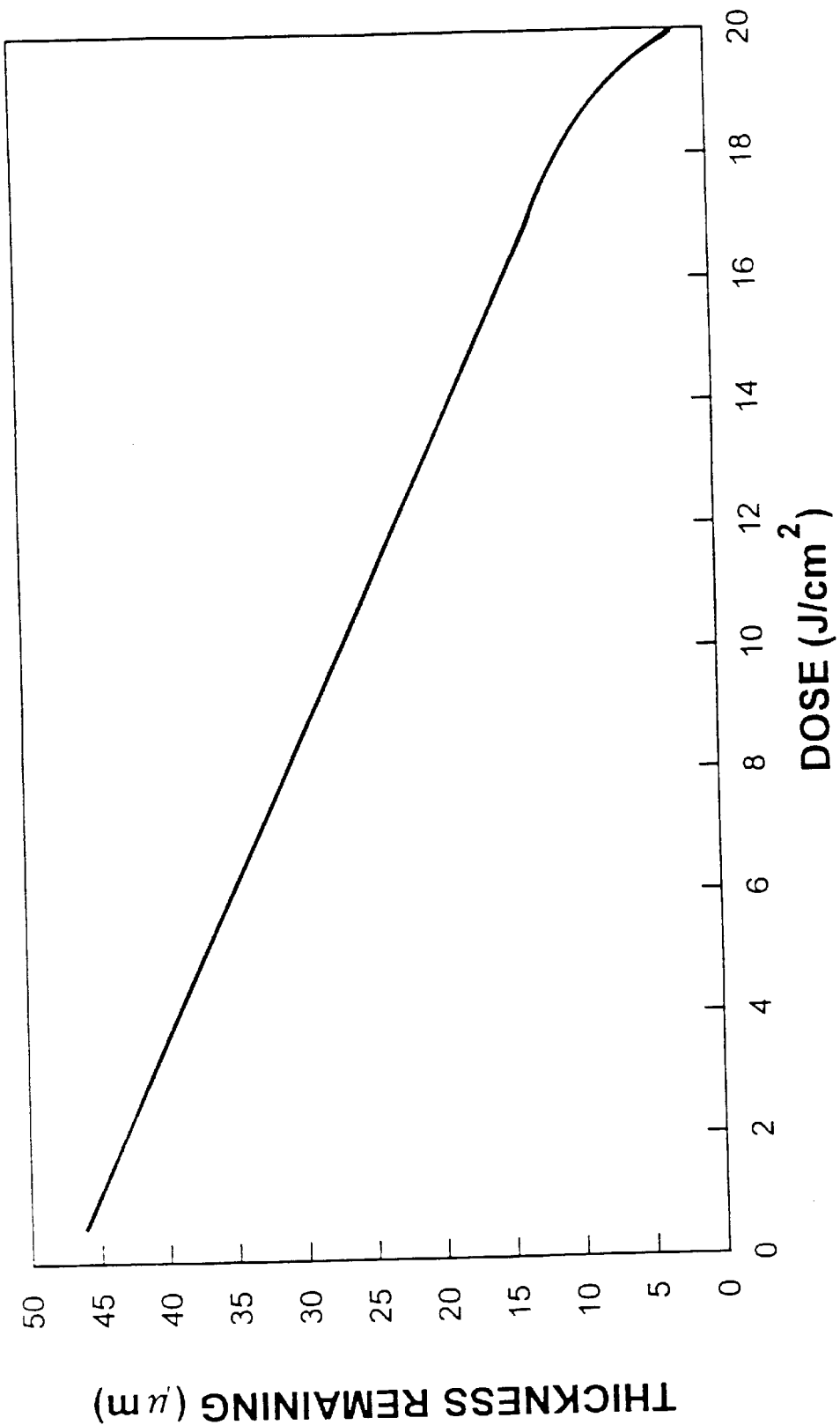
FIG. 3 illustrates a typical curve showing the relationship between development of a PMMA resist and the dose of x-rays.

However, in many applications it will be desirable to blur the exposure to obscure the fine structure of the pixels. Blurring the exposure may be accomplished by moving the mask with respect to the wafer during exposure, or simply by using a large gap between mask and wafer. Using previously established measurements of development versus dose rates, a halftone mask may be designed to yield a desired profile in the resist. See, e.g., FIG. 3. Blurring during exposure is preferred. However, it should also be possible to introduce blurring after exposure by, for example, melting the surface briefly to remove the fine structure, thereby creating a smoothly varying surface.

EXAMPLES

"Halftone Optics"

An important application of halftone lithography is the generation of optical surfaces that are difficult or impossible to fabricate (or in some cases are more expensive to fabricate) through conventional means. Examples of such surfaces include the following:

(1) Strongly aspherical elements, or aspheres, useful for example as elements in camera lenses.

(2) Slightly aspherical elements, or aspheres, which differ from a spherical surface by a few tens of microns, may be generated in a uniform resist film bonded to a spherical surface. A slight asphere could be used to modify the properties of a conventional, high-quality optical lens.

(3) "Fly's eye" lens arrays for optical scanners, for collimating an array of laser diodes, or for joining fiber optics bundles.

(4) Telescope arrays, in which two "fly's eye" lens arrays are registered to one other, as discussed in more detail below.

EXAMPLE

Telescope Arrays

Figure 4:
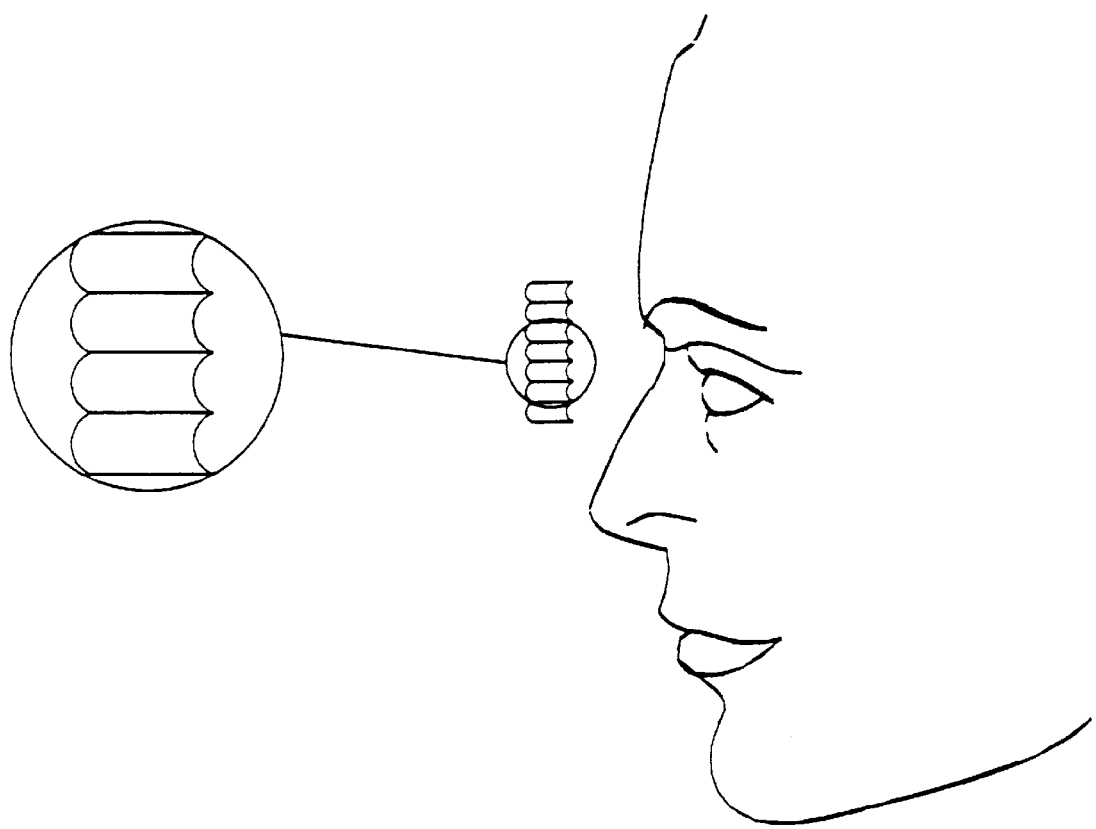
FIG. 4 illustrates an array of microtelescopes.

One application of halftone optics is in generating a novel telescope (or microtelescope) array. Each telescope in the array comprises two lenses formed on opposite sides of a thin transparent sheet, such as a PMMA sheet. See FIG. 4, depicting an array of such microtelescopes. The array may used by holding it close to the eyes, causing distant objects to appear larger and closer. Each telescope in the array functions as does a conventional telescope, but the viewer looks through several telescopes simultaneously with each eye. Therefore, the position of the array with respect to the eyes is not critical.

The novel telescope array has at least two advantages over conventional telescopes, binoculars, or field glasses:

(1) In conventional binoculars, each eye must be properly aligned with the corresponding optical axis of the instrument. Many people find this positioning uncomfortable, or even impossible, to maintain. By contrast, alignment of the eye is not critical with the novel telescope array.

(2) Conventional telescopes and binoculars are relatively bulky. Telescope arrays may be hand held, like a magnifying glass, or fitted to a frame, like eye glasses. The frame may be a stand-alone frame, a clip-on frame, a flip-down frame, or the like. The telescope array may be used alone, or in combination with prescription lenses, sun glasses, dust shields, or the like.

The telescopes in the array are diffraction-limited near the optical axis, and have negligible light loss. Hence images of objects straight ahead are sharp and bright. Sufficiently far off-axis ("looking out of the corner of the eye"), the image quality will degrade, and vignetting will cause image brightness to drop. The angle off-center at which the image brightness drops by a factor of two is defined to be the maximum output angle of the array. (Of course, rotating the head restores the image to the straight-ahead quality.)

The width of a telescope (the diameter of its lenses) is preferably between about 0.1 mm and about 1.0 mm, most preferably about 0.25 mm. The thickness of the telescope, or the distance between the centers of the lenses, is preferably between 0.1 mm and 10 cm, most preferably between about1 and about 5 mm. Typical values of various parameters for the elements of a telescope array are tabulated in Table I below.

TABLE I

Typical Dimensions of Individual Telescope Elements

| Magnification, m | 2 | 3 | 4 |
|---|---|---|---|
| Telescope Width (mm) | 0.25 | 0.25 | 0.25 |
| Thickness, T (mm) | 1.5 | 3.0 | 4.5 |
| Front Radius, R (mm) | 1.0 | 1.5 | 2.0 |
| Back radius (mm) | 0.5 | 0.5 | 0.5 |
| Front Sag, S ($\mu$m) | 7.8 | 5.2 | 3.9 |
| Maximum output angle, $\theta$ (rad) | ±0.250 | ±0.190 | ±0.170 |
| On-axis OPD (nm) | 3.6 | 1.3 | 0.7 |

In Table I, "Front Sag" refers to front sagitta, the depth to which the resist for the front lens must be patterned. "OPD" refers to "optical path difference." If the OPD is less than about ¼ of the wavelength of the light, then the lens (or telescope) is usually considered to be diffraction-limited. Magnifications greater than those listed in Table I are, of course, also possible. However, higher magnifications might result in uncomfortable effects upon head motion, and higher magnification telescopes would have a narrower field of view.

It may sometimes be desirable to fabricate a telescope array on a curved surface in which the axes of the telescopes are perpendicular to the curved surface. This geometry introduces an overall lens effect in addition to the magnification, which may be desirable for some applications. For example, such a curved array could be used to correct nearsightedness in conventionally shaped eyeglass elements, in addition to introducing a magnification factor.

The periodicity of the array can introduce diffractive artifacts. For the dimensions given in Table I, these artifacts will be noticeable to the human eye only under special conditions, e.g., a distant street light at night will have diffractive fringes at about±0.002 rad. Under normal lighting conditions, the diffractive artifacts will not be noticeable.

Figure 5:
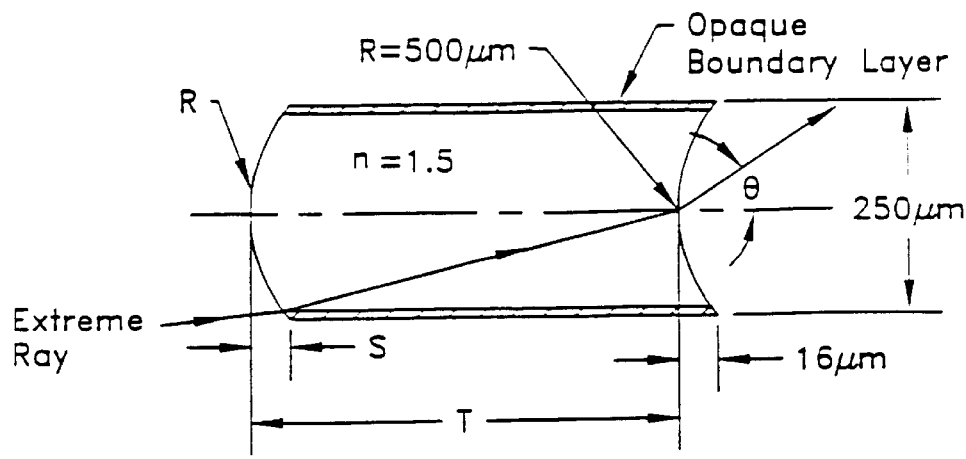
FIG. 5 illustrates a detail of one microtelescope from a microtelescope array.

Each element in the array is a Galilean telescope. FIG. 5 depicts a detail of one microtelescope in the array. The dimensions indicated in FIG. 5 by letters are given in Table I for magnifications of 2, 3, and 4. Galilean telescopes are often used in low power field glasses or opera glasses. The magnification of a Galilean telescope is equal to the ratio of the front (convex) radius to the back (concave) radius. The back radius is chosen as a tradeoff between the maximum output angle and the back sagitta, which is equal to the depth of the patterning required on the back face. Both the output angle and the back sagitta increase as the back radius decreases.

In the embodiment illustrated in FIG. 5, the rear sagitta is 16 μm, and the index of refraction n is 1.5.

Figure 6A:
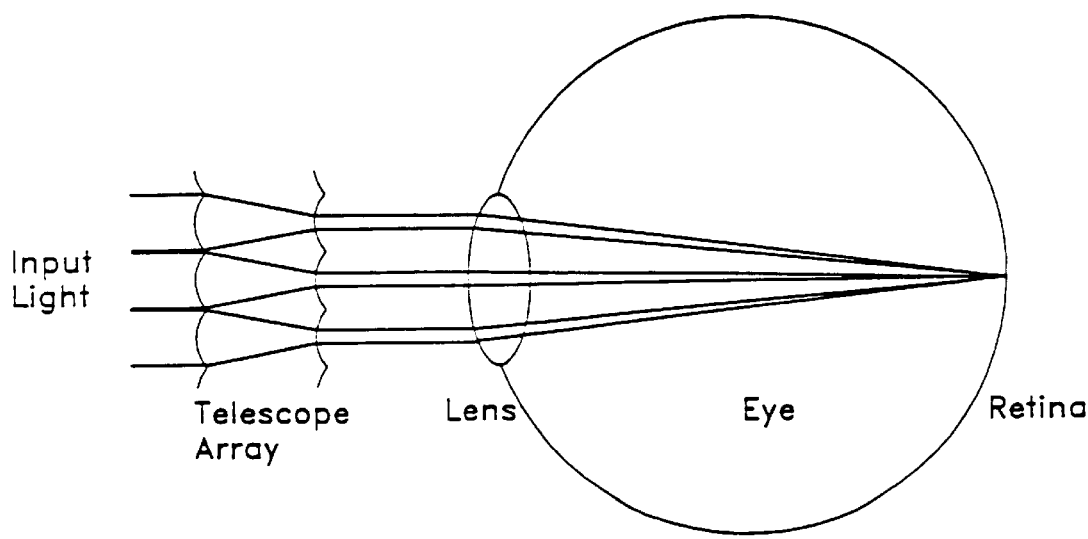
FIG. 6($a$) illustrates the formation of a single image in the eye from several telescopes in a microtelescope array.
Figure 6B:
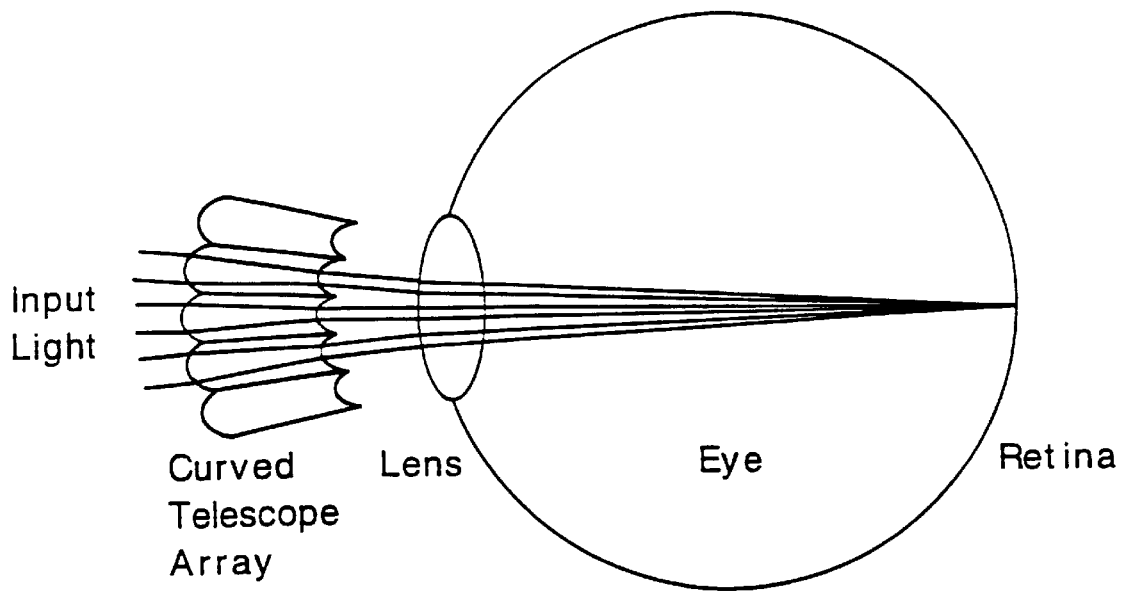
Figure 9:
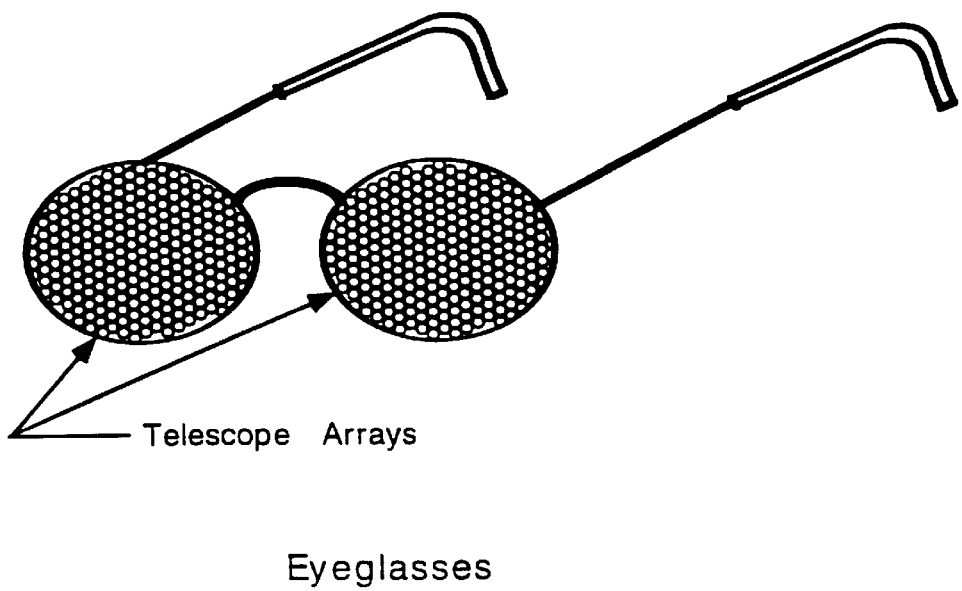
FIG. 9 illustrates an array of microtelescopes in an eyeglass frame.

The preferred telescope width of 250 μm is a tradeoff between minimizing diffractive effects (for which larger widths would be beneficial), and insuring that a large number of telescopes are viewed by the eye simultaneously (for which smaller widths would be beneficial). Because the minimum diameter of the pupil in a human eye is 1 mm, at least 12 telescopes should always contribute to the image at each point on the retina. The minimum array size will thus be slightly less, or about 10 telescopes per array. See FIGS. 6(a) and 6(b), which illustrate the formation of a single image in the eye from several different telescopes in the array. Different telescopes contribute to the image as the relative positions of the array and the viewer's eye change.

The dimensions in Table I are for round elements although square or hexagonal elements may also be used. Hexagonal arrays will often be desirable because they have particularly good packing characteristics. Whatever their shape, each telescope is preferably surrounded by an opaque, index-matched layer, to inhibit reflection and to inhibit crosstalk between adjacent telescopes.

To construct the telescope array, an isolation mask level with relatively hard x-rays may be used to generate a deep trench around each telescope site in a thick block of PMMA resist. The trenches are filled with a solution of dyed PMMA sufficient to cover the PMMA block (e.g., PMMA dyed with powdered carbon, so-called "carbon black"). The solvent is evaporated, and the resist is annealed. The top and bottom of the block are then mechanically removed, leaving isolated plugs of PMMA of the appropriate thickness between opaque layers. Complimentary halftone masks are then used to pattern the front and rear spherical surfaces of the PMMA.

EXAMPLES

Applications of Arrays of Lenses or of Microtelescopes

In addition to their use as visual telescopes, telescope arrays in accordance with this invention may be used for other purposes, either alone or in combination with other optical elements. Among these applications are the following:

(1) Magnifying glass. The telescope array permits a given magnification to be obtained with a longer focal length, and hence with a larger field of view than is possible with a conventional magnifying glass. A larger field of view is a significant advantage that can, for example, help visually impaired persons read a newspaper.

(2) Eyepiece for microscopes and similar instruments.

(3) Viewfinder for cameras.

(4) Various more complex systems may be formed than their current, state-of-the-art analogs, such as systems for infrared or low-level-light "night glasses." In more complex telescope arrays, a real intermediate image may first be formed by a first array of single lenses. This real image may, for example, be an infrared image, or a low-intensity image in visible wavelengths. Electronic amplification techniques known in the art may then be used to convert the image to a bright visible image. The bright visible image is then viewed through a second array of lenses positioned in front of the eyes. (The position of the second array relative to the eyes is not critical.) The array of telescopes produces inverted images. The images are re-inverted by another array of lenses. Alternatively, the additional array of lenses could be eliminated, with the re-inversion function performed electronically in conjunction with the electronic amplification.

(5) Combining a lens array with a high-resolution display in a three-dimensional virtual reality display system that is more compact than the current state of the art for virtual reality displays.

A common feature of the above applications is that the location of the array with respect to the viewer's eye is not critical in forming images of a variety of objects on the retina. The objects form a system, or are viewed by a system, whose location relative to an array of lenses can, however, be critical. This system may include another array of lenses, video displays, multiple video displays, intensified images, and the like.

The telescope array may be formed on a cylindrically or spherically curved surface. If the eye is positioned on the concave side of the surface, the effect of the curvature is to add a negative lens to the telescope focal length $f=R/(1-m)$, where R is the radius of curvature. This curvature may be compensated by a positive lens of focal length f after the telescope, or focal length $mf=mR/(1-m)$ before the telescope. This effect may be exploited for prescription telescopes: e.g., m=2 and R=20 cm corresponds to a corrective lens of −5 diopters.

It should also be possible to construct a telescope array as disclosed with high-quality conventional casting techniques instead of lithographic techniques, because the individual elements are preferably of small but macroscopic size (250 μm). A telescope array will first be made lithographically as disclosed above, except that the interstices between telescopes will not be filled with dye. This lithographic array will then be used as a template for a mold for casting telescope arrays through high-quality conventional techniques.

As those skilled in the art will recognize, these inventions may, of course, be practiced with either negative-tone or positive-tone resists. Each of the Claims below is intended to read on methods performed with, or microstructures fabricated with, either negative-tone or positive-tone resists.

As used in the specification and claims, the term "vertical" refers to a direction that is perpendicular or normal to the plane of the base of a microstructure, or to the plane of a photoresist layer, rather than to the direction of local gravitational forces.

I claim:

1. A method for fabricating a microstructure in a radiation-sensitive resist having a relaxed conformation, wherein the microstructure comprises a selected pattern having at least one feature with at least one non-vertical edge, said method comprising the steps of:

(a) reversibly deforming the resist into a three-dimensional conformation that differs from the relaxed conformation of the resist;

(b) selectively exposing portions of the deformed resist to radiation to which the resist is sensitive;

(c) returning the resist to the relaxed conformation; and (d) developing the resist either to selectively remove the radiation-exposed portions of the resist, or to selectively remove the unexposed portions of the resist;

whereby a pattern is formed in the resist having at least one feature with at least one non-vertical edge.

2. A microstructure fabricated by the method of claim 1.

3. A method as recited in claim 1, wherein the relaxed conformation of the resist is planar.

4. A microstructure fabricated by the method of claim 3.

5. A method as recited in claim 3, wherein the deformed three-dimensional conformation of the resist is spherical.

6. A microstructure fabricated by the method of claim 5.

7. A method as recited in claim 5, wherein said reversibly deforming step comprises applying a pressure differential across the resist.

8. A microstructure fabricated by the method of claim 7.

9. A method as recited in claim 5, wherein the selectively exposed portions of the resist comprise a plurality of circular concentric annuli, whereby the pattern formed in the developed resist comprises a plurality of nested cones.

10. A microstructure fabricated by the method of claim 9.

11. A method for fabricating a microstructure in a radiation-sensitive resist, wherein the microstructure comprises a selected pattern having at least one three-dimensional feature with a continuously variable height, said method comprising the steps of:

(a) exposing the resist to radiation to which the resist is sensitive through a mask comprising pixels of discrete absorbers of the radiation, wherein the size of the absorber in each pixel corresponds to the height of the corresponding part of the pattern; and (b) developing the resist to selectively remove resist to a depth corresponding to the amount of radiation received by each location of the resist;

wherein said exposing step or said developing step is performed with sufficient blurring that the fine structure of the absorbers is not apparent in the developed pattern; whereby a pattern is formed in the resist having at least one feature with a continuously variable height.

12. A microstructure fabricated by the method of claim 11.

13. A microstructure as recited in claim 12, wherein said microstructure is transparent to visible light, and wherein at least one feature on said microstructure comprises a lens with a spherical surface.

14. A microstructure as recited in claim 12, wherein said microstructure is transparent to visible light, and wherein at least one feature on said microstructure comprises a lens having a surface that is aspherical.

15. A microstructure as recited in claim 12, wherein said microstructure is transparent to visible light, and wherein said microstructure comprises an array of a plurality of lenses.

16. A combination comprising an array as recited in claim 15, and an electronic amplifier of an initial visible-light image, wherein said electronic amplifier detects and amplifies the initial visible-light image to an output of a brighter visible light image, whereby a user viewing said output image through said array will see an amplification of the initial visible-light image.

17. A combination comprising an array and electronic amplifier as recited in claim 16, and an initial array of a plurality of lenses, wherein said initial array of a plurality of lenses magnifies the initial visible light image prior to detection and amplification by said electronic amplifier.

18. A microstructure as recited in claim 15, wherein said microstructure additionally comprises opaque regions between said lenses to inhibit light from one of said lenses entering another of said lenses.

19. A combination comprising an array as recited in claim 15, and a video display, wherein the image output from the video display is input to the lenses of said array, whereby a user viewing said array from the opposite face of said array will see a magnification of the image output from the video display.

20. A combination comprising an array and a video display as recited in claim 19, and an electronic amplifier of an initial visible-light image, wherein said electronic amplifier detects and amplifies the initial visible-light image, and transmits a signal corresponding to the amplified image to the said video display, whereby a user viewing said video display through said array will see an amplified visible-light image of the infrared image.

21. A combination comprising an array, electronic amplifier, and a video display as recited in claim 20, and an initial array of a plurality of lenses, wherein said initial array of a plurality of lenses magnifies the initial visible light image prior to detection and amplification by said electronic amplifier.

22. A combination comprising an array and a video display as recited in claim 19, and an electronic amplifier of an infrared image, wherein said electronic amplifier detects and amplifies the infrared image, and transmits a signal corresponding to the amplified image to the said video display, and wherein the video display is adapted to transform the signal into a visible-light image, whereby a user viewing said video display through said array will see an amplified visible-light image of the infrared image.

23. A combination comprising an array, electronic amplifier, and a video display as recited in claim 22, and an initial array of a plurality of lenses, wherein said initial array of a plurality of lenses magnifies the initial visible light image prior to detection by said electronic amplifier.

24. A microstructure as recited in claim 12, wherein said microstructure is transparent to visible light, and wherein said microstructure comprises an array of a plurality of telescopes, each said telescope having a first lens that is spherically convex and a second lens that is spherically concave.

25. A microstructure as recited in claim 24, wherein said microstructure additionally comprises opaque regions between said telescopes to inhibit light from one of said telescopes entering another of said telescopes.

26. A microstructure as recited in claim 25, wherein said telescopes are hexagonally packed with respect to one another.

27. A microstructure as recited in claim 26, wherein the diameter of each of said lenses is between about 0.1 mm and about 1.0 mm.

28. A microstructure as recited in claim 27, wherein the diameter of each of said lenses is about 0.25 mm.

29. A method for fabricating a microstructure comprising a security mark in a radiation-sensitive resist, said method comprising the steps of:

(a) exposing the resist to radiation to which the resist is sensitive through a mask comprising pixels of discrete absorbers of the radiation, wherein the size of the absorber in each pixel corresponds to the features of the security mark; and (b) developing the resist to selectively remove resist at locations that were exposed to the radiation, or to selectively remove resist at locations that were not exposed to the radiation;

wherein the size of one pixel, as imaged on the resist, is less than 700 nm across; whereby a security mark is formed in the resist.

30. A microstructure fabricated by the method of claim 29.

31. A microstructure comprising a selected three-dimensional pattern having at least one three-dimensional feature with a continuously variable height in accordance with the selected pattern.

* * * * *